US005165423A

United States Patent [19]

Fowler et al.

[11] Patent Number: 5,165,423

[45] Date of Patent: Nov. 24, 1992

[54] TOOTH GUARD WHISTLE

[76] Inventors: Ian K. Fowler, 6407 N. Glenwood #3, Chicago, Ill. 60626; George Spector, 233 Broadway, Rm. 3815, New York, N.Y. 10007

[21] Appl. No.: 767,863

[22] Filed: Sep. 30, 1991

[51] Int. Cl.[5] ........................ A61C 5/14; A63H 33/40

[52] U.S. Cl. .................................... 128/861; 446/202

[58] Field of Search ............... 128/861, 862, 859, 860; 433/33, 34; 446/202, 204; 84/330, 453

[56] References Cited

U.S. PATENT DOCUMENTS

| | | | |
|---|---|---|---|
| 31,876 | 11/1899 | Couchois | 446/204 |
| 61,846 | 2/1867 | McClain | 446/204 |
| 497,759 | 5/1893 | Beardsley | 446/204 |
| 733,122 | 4/1903 | Bartholomew | 446/204 |
| 1,092,507 | 4/1914 | Putman | 446/204 |
| 1,367,176 | 2/1921 | Bridges | 446/202 |
| 1,437,317 | 11/1922 | Klein | 446/204 |
| 2,463,630 | 3/1949 | Kimple | 446/204 |
| 2,911,694 | 11/1959 | Seron | 446/204 |
| 3,211,143 | 10/1965 | Grossberg | 128/862 |
| 4,218,845 | 8/1980 | Evans | 446/202 |
| 4,495,945 | 1/1985 | Liegner | 128/862 |
| 4,614,503 | 9/1986 | Skoda | 446/202 |
| 4,955,393 | 9/1990 | Adell | 128/861 |

*Primary Examiner*—Michael A. Brown

[57] ABSTRACT

A tooth guard whistle is provided which consists of a curved mouthpiece worn between the teeth and lips of a person for protecting the teeth. The mouthpiece has a central air passage and a plurality of side air passages. A small wind instrument is connected to the central air passage, so that in a first instance when the lips of the person do not cover the side air passages, the person can breath through the curved mouthpiece, while in a second instance when the lips of the person cover the side air passages, the person can force air through the central air passage to operate the small wind instrument.

3 Claims, 1 Drawing Sheet

TOOTH GUARD WHISTLE

BACKGROUND OF THE INVENTION

The instant invention relates generally to whistles and more specifically it relates to a tooth guard whistle which provides protection for the teeth should mouth impact occur.

There are available various conventional whistles which do not provide the novel improvements of the invention herein disclosed.

SUMMARY OF THE INVENTION

A primary object of the present invention is to provide a tooth guard whistle that will overcome the shortcomings of the prior art devices.

Another object is to provide a tooth guard whistle which combines the functions of both a whistle and a tooth guard in a single unit thereby protecting the teeth should mouth impact occur.

An additional object is to provide a tooth guard whistle in which in one instance the whistle is separable from the tooth guard and in another instance the whistle is integral with the tooth guard.

A further object is to provide a tooth guard whistle that is simple and easy to use.

A still further object is to provide a tooth guard whistle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
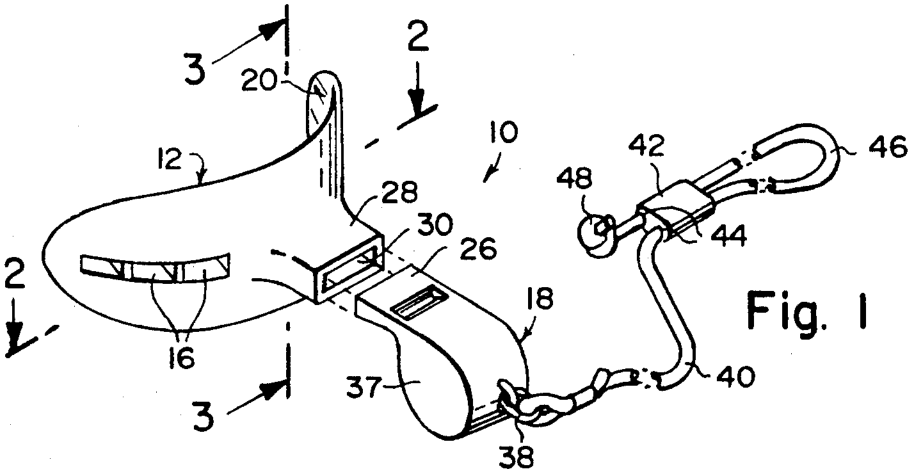
FIG. 1 is a perspective view of the instant invention.

Turning now descriptively to the drawings, in which similar reference characters denote similar elements throughout the several views, the Figures illustrate a tooth guard whistle 10 which consists of a curved malleable mouthpiece 12, worn between the teeth and lips of a person foı protecting the teeth. The mouthpiece 12 has a central air passage 14 and a plurality of side and front air passages 16. A small wind instrument 18 is connected to the central air passage 14. In a first instance, when the lips of the person do not cover the side air passages 16, the person can breath through the curved mouthpiece 12. In a second instance, when the lips of the person cover the side air passages 16, the person can force air through the central air passage 14 to operate the small wind instrument 18.

The curved mouthpiece 12 further includes a back rib 20 that bisects laterally the curved mouthpiece, in which the side air passage 16 extend therethrough. The back rib 20 separates the upper set of teeth from the lower set of teeth of the person.

The curved mouthpiece 12 further includes an inner skeletal structure of vertical walls 22 of non-toxic semi-rigid material, such as nylon and the like and an outer molded covering 24 of a softer, more flexible non-toxic material, such as latex and the like.

Figure 2:
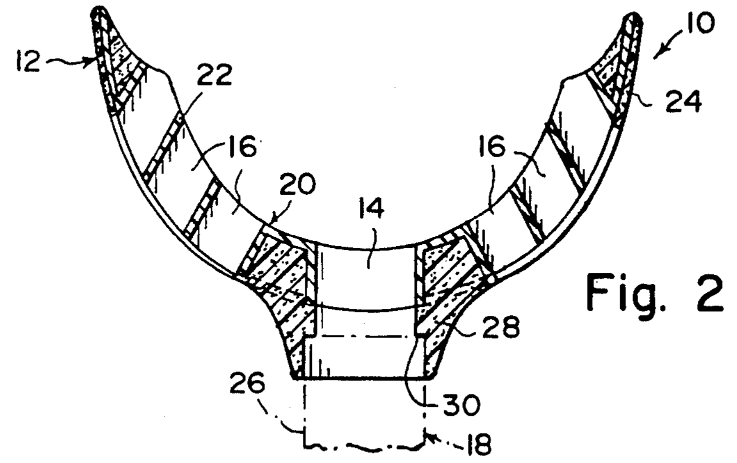
FIG. 2 is a horizontal cross sectional view taken along line 2—2 in FIG. 1.
Figure 3:
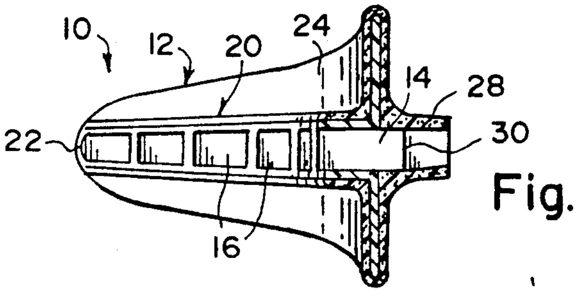
FIG. 3 is a vertical cross sectional view taken along line 3—3 in FIG. 1.

The tooth guard whistle 10, as shown in FIGS. 1 through 3, further includes the small wind instrument 18 having a stem 26 that is separable from the curved mouthpiece 12. The curved mouthpiece 12 has a front mount member 28 with a recess 30 therein, formed out of the outer molded covering 24 at the central air passage 14. The stem 26 of the small wind instrument 18 can be inserted within the recess 30 in the front mount member 28 and be held securely in place thereto by pressure and friction, while should impact occur, the stem 26 will separate therefrom.

Figure 4:
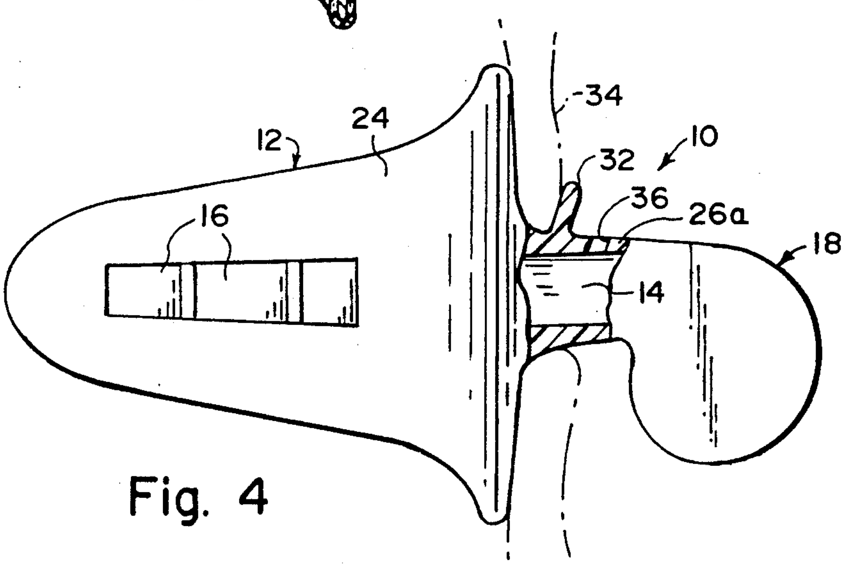
FIG. 4 is a side view with parts broken away showing an integral whistle built therein and an upwardly extending projection for the upper lip.

The tooth guard whistle 10, as shown in FIG. 4, further includes the small wind instrument 18 having a stem 26a that is integral with the central air passage 14. An upwardly extending projection 32 is on the stem 26a of the small wind instrument 18 for the upper lip 34 of the person so that the upper lip 34 will not interfere with an air slot 36 in the small wind instrument 18.

As best seen in FIG. 1, the small wind instrument 18 can be a standard contained-ball type whistle 37, with a ring 38 on the rear of the whistle, to which a security cord 40 is attached being formed of a strong flexible material, such as a nylon cord. At the end of the security cord 40 opposite the ring 38, is a sliding fastener 42 being a short length of extruded rubber or similar material. Two parallel holes 44 run the length of the sliding fasteners 42. The holes 44 are sized to prevent the security cord 40 from unintentional slippage, while an adjustable neck loop 46 can be formed from the security cord 40 with a knot 48 formed at its distal end.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A tooth guard whistle which comprises:

a) a curved mouthpiece with a front wall fitting the face, mouth and teeth worn between the teeth and lips of a person for protecting the teeth, said mouthpiece having a central air passage and a plurality of side air passages through said wall and;

b) a small wind instrument connected to said central air passage, so that in a first instance when the lips of the person do not cover said side air passages, the person can breath through said curved mouthpiece, while in a second instance when the lips of the person cover said side air passages the person can force air through said central air passages to operate said small wind instrument; wherein said curved mouthpiece further includes a back rib that bisects laterally said curved mouthpiece, in which said side air passages extend therethrough, said back rib separates the upper set of teeth from the lower set of teeth of the person; wherein said curved mouthpiece and rib further includes:

c) an inner skeletal structure of non-toxic semirigid material through which said side and front air passages are formed through opposing inwardly parallel vertical walls and;

d) an outer molded covering of a softer, more flexible non-toxic material, said covering being mounted over said vertical walls and said back ribs to provide a soft biting surface for the users teeth.

2. A tooth guard whistle as recited in claim 1, in combination with:

a) said small wind instrument having a stem that is separable from said curved mouthpiece; and b) said curved mouthpiece having a front mount member with a recess therein formed out of said outer molded covering at the central air passage so that said stem of said small wind instrument can be inserted within the recess in said front mount member and be held securely in place thereto by pressure and friction, while should impact occur, said stem will separate therefrom.

3. A tooth guard whistle as recited in claim 1, further including:

a) said small wind instrument has a stem that is connected with the central air passage; and b) an upwardly extending projection parallel spaced from the center of said wall on said stem of said small wind instrument for receiving the upper lip of the person so that the upper lip will not interfere with a usual air slot in said small wind instrument.

* * * * *